Patented Nov. 1, 1949

2,486,426

UNITED STATES PATENT OFFICE 2,486,426

FEED FOR YOUNG FOWL AND METHODS OF PREPARING AND USING SAME

Malvin Elbert McGaha, Riverdale, Md.

No Drawing. Application January 4, 1946,
Serial No. 639,154

8 Claims. (Cl. 99—4)

This invention relates to the feeding of fowl, such as newly hatched chicks, turkey poults, and game birds which oftentimes are difficult to teach to eat certain types of feed, such as standard mashes, which can be considered commercially economical.

An object of this invention is to provide a method of teaching young fowl to eat certain feed which they have little or no natural inclination to eat.

A further object of the invention is to provide a feed which it is desirable for certain fowl to eat, with means for attracting the fowl and encouraging them to eat, and which means can itself be incidentally eaten by the fowl and be entirely harmless to them.

In the past efforts to accomplish the desired result have been attempted without success. Among other things, large objects of various colors, such as buttons and marbles, have been placed in the feed so as to encourage the birds to pick at such object and accidentally get some of the feed. However, the objects used were intentionally so large that the birds could not eat them, and therefore practically no feed was incidentally eaten. Furthermore, the fowl did not learn that the feed was edible apart from the idea of picking at the inedible objects.

Furthermore, certain edible substances, such as rolled oats or sliced hardboiled eggs have been added to the feed (mash). The poult was attracted to these added foodstuffs and ate them, but there was little transfer of interest to the standard mash, which is the most economical ration. The object was therefore not accomplished.

According to the present invention, the standard feed which the operator desires the fowl to learn to eat might be a starting or growing mash of a desirable nutritive composition for young fowl, for example, young chicks, turkey poults or game birds. To this feed is added a small quantity, for example, about 5% by weight, of a harmless mineral in comminuted form of very light weight and having light-reflective properties. It was found that vermiculite which had been heat treated to produce expansion and which had later been ground in a hammer mill using a ⅛" screen to break up the expanded vermiculite and was then mixed with the mash, accomplished the desired results. The vermiculite after being ground was screened, and the material passing a No. 5 screen but remaining on the No. 20 screen was found to be the most satisfactory size, although a small amount of larger and smaller material may be used for the sake of economy. The screened vermiculite is flaky, very light in weight (6 to 20 lbs. per cubic foot), and the flakes have a color ranging from silvery, to golden, to blue, to brown, to black, and the flakes have the property of reflecting light, giving same various hues of silver, blue, green, gold, and brown. These iridescent, metallic colors attract the young chick, turkey or other fowl, but due to the very small size of the particles of vermiculite, and because of lack of precise muscular control and faulty eyesight of the very young fowl, a quantity of food is ingested along with the tiny piece of vermiculite. The vermiculite particle is not digested, but it has been found by experiment to be harmless.

Thus the turkey or fowl picks at a very small particle of non-digestible material, and in error takes food along with the particle used for attraction. Since the taking of mash or other food is promoted in this manner, the habit of taking of the food the operator desires to administer continues, and there are no habits developed which are detrimental. In other words, the tiny particles of vermiculite or similar materials having reflective qualities successfully accomplish, without producing undesirable habits, the transfer of interest from itself to the regular mash or other feed.

As a result of successfully encouraging the early taking of food by turkeys, game birds, and domestic fowl, mortality is reduced and the young birds gain weight and strength more quickly. The very small amount of vermiculite eaten is harmless in itself, but its presence also helps to improve the physical condition of the feed, and to aid in digestion.

I claim:

1. The method of promoting the eating of feed by young fowl comprising, comminuting a mineral substance, having light-reflective properties and having a weight when comminuted of about 6 to 20 lbs. per cubic foot and which is harmless to the fowl when eaten, to a size range so small that when mixed with nutritive mash feed the fowl will eat the feed along with the particles of the mineral, mixing the comminuted mineral with the nutritive mash feed, and placing the mixture before the young fowl.

2. The method of promoting the eating of feed by young fowl comprising, comminuting expanded vermiculite which is harmless to the fowl when eaten to a size range so small that when mixed with nutritive mash feed the fowl will eat the nutritive feed along with the particles of the mineral, mixing the comminuted mineral with the nutritive mash feed, and placing the mixture before the young fowl.

3. The method of promoting the eating of feed by young fowl comprising, comminuting vermiculite to substantially a size passing a No. 5 screen and being retained on a No. 20 screen, which size is sufficiently small that the fowl will eat the nutritive feed along with the particles of vermiculite when mixed with the nutritive feed, mixing the vermiculite with the nutritive mash feed, and placing the mixture before the young fowl.

4. The method of promoting the eating of feed by young fowl comprising, comminuting vermiculite to substantially a size passing a No. 5 screen and being retained on a No. 20 screen, which size is sufficiently small that the fowl will eat the nutritive feed along with the particles of vermiculite when mixed with the feed, mixing about 5% by volume of the vermiculite with the nutritive mash feed, and placing the mixture before the young fowl.

5. The method of promoting the eating of feed by young fowl comprising, comminuting vermiculite to substantially a size passing a No. 5 screen and being retained on a No. 20 screen, which size is sufficiently small that the fowl will eat the nutritive feed along with the particles of vermiculite when mixed with the feed, mixing about 5% by weight of the vermiculite with the nutritive mash feed, and placing the mixture before the young fowl.

6. A feed for fowl comprising, mash having nutritive properties and containing interspersed therein particles of expanded vermiculite which is harmless to the fowl when eaten, the vermiculite being in such small size as to be easily eaten by the fowl, contrasting in appearance with the mash and attractive to the fowl so as to induce the fowl to eat the mineral and to incidentally ingest a substantial amount of the nutritive mash.

7. A feed for fowl comprising, mash having nutritive properties and containing interspersed therein particles of a colorful iridescent mineral having a weight of about 5 to 20 lbs. per cubic foot and which is harmless to the fowl when eaten, the mineral being in such small size as to be easily eaten by the fowl, contrasting in appearance with the mash and attractive to the fowl so as to induce the fowl to eat the mineral and to incidentally ingest a substantial amount of the nutritive mash.

8. A feed for fowl comprising, mash having nutritive properties and containing interspersed therein about 5% by weight of particles of expanded vermiculite having a size range adapted to pass a No. 5 screen and remain on a No. 20 screen and having a weight of about 5 to 20 lbs. per cubic foot and which is harmless to the fowl when eaten, the vermiculite particles being iridescently colorful and contrasting in appearance with the mash and thus attracting the fowl and inducing the fowl to eat the mineral and incidentally ingest a substantial amount of the nutritive mash.

MALVIN ELBERT McGAHA.

REFERENCES CITED

The following references are of record in the file of this patent:

UNITED STATES PATENTS

| Number | Name | Date |
|---|---|---|
| 826,990 | Cartwright | July 24, 1906 |
| 1,178,279 | Uffel | Apr. 4, 1916 |
| 2,152,438 | McHan | Mar. 28, 1939 |
| 2,331,807 | Shea | Oct. 12, 1943 |

FOREIGN PATENTS

| Number | Country | Date |
|---|---|---|
| 87,507 | Sweden | 1936 |